US010207672B2

(12) United States Patent
Barron

(10) Patent No.: US 10,207,672 B2
(45) Date of Patent: Feb. 19, 2019

(54) TELESCOPING VEHICLE SAFETY GUARD

(71) Applicant: Public Transportation Safety International Corp., Los Angeles, CA (US)

(72) Inventor: Mark B. Barron, Los Angeles, CA (US)

(73) Assignee: PUBLIC TRANSPORTATION SAFETY INTERNATIONAL CORP., Los Angeles, CA (US)

( * ) Notice: Subject to any disclaimer, the term of this patent is extended or adjusted under 35 U.S.C. 154(b) by 85 days.

(21) Appl. No.: 15/619,676

(22) Filed: Jun. 12, 2017

(65) Prior Publication Data

US 2017/0274865 A1  Sep. 28, 2017

Related U.S. Application Data

(62) Division of application No. 14/884,422, filed on Oct. 15, 2015, now Pat. No. 9,676,367.

(51) Int. Cl.
*B60R 19/00* (2006.01)
*B60R 21/34* (2011.01)
*B60R 19/56* (2006.01)
*B60R 19/54* (2006.01)
*B60R 21/00* (2006.01)

(52) U.S. Cl.
CPC ............ *B60R 21/34* (2013.01); *B60R 19/54* (2013.01); *B60R 19/565* (2013.01); *B60R 2019/002* (2013.01); *B60R 2021/0039* (2013.01); *B60R 2021/0067* (2013.01); *B60R 2021/346* (2013.01)

(58) Field of Classification Search
CPC . B60R 21/34; B60R 19/54; B60R 2021/0067; B60R 2019/002; B60R 2021/0039; B60R 25/005; Y10T 70/573; Y10T 70/5735; Y10T 70/5889; B60N 2/286
USPC .......................................................... 293/58
See application file for complete search history.

(56) References Cited

U.S. PATENT DOCUMENTS

| | | |
|---|---|---|
| 2,406 A | 12/1841 | Naglee et al. |
| 3,450 A | 2/1844 | Tolles |
| 39,011 A | 6/1863 | Gillen |
| 45,316 A | 12/1864 | Castor |
| 55,663 A | 6/1866 | Jenkins |
| 79,600 A * | 7/1868 | Riley ...................... B61F 19/02 293/58 |
| 159,632 A | 2/1875 | Blackford et al. |

(Continued)

FOREIGN PATENT DOCUMENTS

| | | |
|---|---|---|
| CA | 2098937 | 12/1994 |
| DE | 2220674 | 11/1973 |

(Continued)

*Primary Examiner* — Kiran B Patel
(74) *Attorney, Agent, or Firm* — Diederiks & Whitelaw, PLC

(57) ABSTRACT

A safety guard for a vehicle, such as a school or transit bus, includes a skirt extending below a side body portion of the vehicle and between front and rear wheels along a side of the vehicle. The skirt functions to push individuals and other animate objects out of the path of the wheels for safety purposes, while being mounted for separate linear and arcuate movements relative to the body of the vehicle to protect the guard from damage upon abutting an inanimate object during operation of the vehicle.

20 Claims, 11 Drawing Sheets

(56) References Cited

U.S. PATENT DOCUMENTS

| | | | | |
|---|---|---|---|---|
| 190,563 A | | 5/1877 | Day | |
| 195,738 A | | 10/1877 | Wood | |
| 217,676 A | | 7/1879 | Brown | |
| 220,082 A | | 9/1879 | Mahon | |
| 223,473 A | * | 1/1880 | Brisac | B61F 19/02 293/58 |
| 226,970 A | | 4/1880 | Brisac | |
| 238,258 A | | 3/1881 | Stephenson | |
| 277,490 A | | 5/1883 | Jacobs | |
| 339,857 A | | 4/1886 | Clarke | |
| 340,561 A | | 4/1886 | Creager | |
| 346,762 A | * | 8/1886 | Marston | B61F 19/02 293/58 |
| 347,269 A | | 10/1886 | Goldsmith | |
| 354,831 A | | 12/1886 | French | |
| 364,230 A | * | 6/1887 | Durfee | E01H 8/10 37/203 |
| 381,881 A | | 4/1888 | Mahon | |
| 394,975 A | * | 12/1888 | Hachenberg | B60R 21/34 293/48 |
| 470,362 A | * | 3/1892 | Nagele | B61F 19/02 293/58 |
| 488,353 A | * | 12/1892 | Gamage et al. | B60R 21/34 293/48 |
| 489,320 A | | 1/1893 | Mortimer et al. | |
| 489,848 A | | 1/1893 | Clarke | |
| 490,772 A | | 1/1893 | Mahon | |
| 523,208 A | * | 7/1894 | Kallauner | E01B 27/06 104/279 |
| 547,707 A | | 10/1895 | Breul | |
| 551,700 A | | 12/1895 | Walier | |
| 587,060 A | | 7/1897 | Noraconk | |
| 709,208 A | | 9/1902 | Crandal | |
| 711,569 A | * | 10/1902 | Hollis | B61F 19/02 293/58 |
| 734,968 A | | 7/1903 | Schwinger, Jr. | |
| 806,143 A | | 12/1905 | Hoey | |
| 821,863 A | * | 5/1906 | Derr | B61B 13/04 104/280 |
| 824,541 A | | 6/1906 | Hager et al. | |
| 826,768 A | | 7/1906 | Craley | |
| 914,985 A | | 3/1909 | Sprint | |
| 962,323 A | * | 6/1910 | Deemer et al. | B61F 19/02 280/160 |
| 1,002,114 A | * | 8/1911 | Barnes | B60R 21/34 293/13 |
| 1,011,214 A | | 12/1911 | Lillich | |
| 1,013,078 A | | 12/1911 | Simon | |
| 1,050,405 A | | 1/1913 | Gelder | |
| 1,060,475 A | | 4/1913 | McGowan | |
| 1,065,055 A | | 6/1913 | Lawrence | |
| 1,068,913 A | | 7/1913 | Mellino | |
| 1,072,965 A | | 9/1913 | Manteau | |
| 1,091,409 A | | 3/1914 | West | |
| 1,095,017 A | * | 4/1914 | Minnich | B61F 19/02 293/58 |
| 1,099,058 A | | 6/1914 | Kruckow | |
| 1,104,647 A | | 7/1914 | Finkelstein | |
| 1,157,460 A | | 10/1915 | Throckmorton | |
| 1,218,583 A | | 3/1917 | Rubenstein | |
| 1,222,828 A | | 4/1917 | Weinberg et al. | |
| 1,230,911 A | | 6/1917 | Loeb | |
| 1,232,835 A | | 7/1917 | Ostrowiecki | |
| 1,283,428 A | | 10/1918 | Tookey | |
| 1,295,692 A | | 2/1919 | Cantlon | |
| 1,325,690 A | | 12/1919 | Cantlon | |
| 1,325,705 A | | 12/1919 | Sleeman | |
| 1,397,825 A | | 11/1921 | Thompson | |
| 1,411,254 A | | 4/1922 | Braucci | |
| 1,412,524 A | * | 4/1922 | Howard | B60R 21/34 293/12 |
| 1,416,610 A | * | 5/1922 | Cochran | B61F 19/02 293/58 |
| 1,464,205 A | | 8/1923 | Kuno | |
| 1,511,085 A | | 10/1924 | McIntyre | |
| 1,523,623 A | | 1/1925 | Altman | |
| 1,530,017 A | | 3/1925 | Souliotis | |
| 1,581,041 A | * | 4/1926 | De Barrios | B60R 21/34 293/118 |
| 1,586,786 A | * | 6/1926 | Davies | B60R 19/023 293/58 |
| 1,691,018 A | | 11/1928 | Scott | |
| 1,700,645 A | | 1/1929 | Ritenour | |
| 1,737,952 A | | 12/1929 | Storch et al. | |
| 1,742,148 A | | 12/1929 | Ritenour | |
| 1,748,304 A | * | 2/1930 | Miyaoka | B60R 21/34 293/58 |
| 1,805,933 A | * | 5/1931 | Victor | B60R 19/54 15/245 |
| 1,885,611 A | | 11/1932 | Lilley | |
| 1,899,937 A | | 3/1933 | Brown | |
| 1,936,054 A | | 11/1933 | Harzbecker | |
| 2,017,227 A | * | 10/1935 | Barnhart | B62D 25/186 280/849 |
| 2,078,479 A | | 4/1937 | Golphin | |
| 3,784,226 A | | 1/1974 | Wilfert et al. | |
| 3,784,244 A | | 1/1974 | Emi | |
| 3,794,373 A | | 2/1974 | Manning | |
| 3,809,167 A | | 5/1974 | Glider | |
| 3,913,963 A | | 10/1975 | Persicke | |
| 3,956,111 A | | 5/1976 | Manfredi | |
| 4,076,295 A | | 2/1978 | Gutman | |
| 4,077,141 A | | 3/1978 | Stedman | |
| 4,093,290 A | | 6/1978 | Pearson | |
| 4,103,918 A | | 8/1978 | Salden | |
| 4,203,623 A | | 5/1980 | Fenner et al. | |
| 4,221,410 A | | 9/1980 | Dawson | |
| 4,249,632 A | | 2/1981 | Lucchini et al. | |
| 4,362,310 A | | 12/1982 | Goodall | |
| 4,620,745 A | | 11/1986 | Jacobs | |
| 4,688,824 A | | 8/1987 | Herring | |
| 4,763,939 A | | 8/1988 | Zhu | |
| 4,877,266 A | * | 10/1989 | Lamparter | B60R 19/56 280/762 |
| 4,930,823 A | | 6/1990 | Rivera | |
| 5,280,990 A | | 1/1994 | Rinard | |
| 5,313,189 A | | 5/1994 | Dodd et al. | |
| 5,462,324 A | * | 10/1995 | Bowen | B60R 21/34 280/849 |
| 5,735,560 A | | 4/1998 | Bowen et al. | |
| 5,836,399 A | * | 11/1998 | Maiwald | B62D 25/186 172/509 |
| 6,007,102 A | | 12/1999 | Helmus | |
| 6,193,278 B1 | * | 2/2001 | Ward | B62D 25/18 280/848 |
| 7,163,258 B2 | | 1/2007 | Dyer, II et al. | |
| 7,188,875 B2 | | 3/2007 | Norelius | |
| 7,942,470 B2 | | 5/2011 | Boivin et al. | |
| 8,162,384 B2 | | 4/2012 | Giromini et al. | |
| 8,322,778 B1 | | 12/2012 | Pfaff | |
| 8,408,570 B2 | | 4/2013 | Heppel et al. | |
| 2009/0218787 A1 | | 9/2009 | Jones et al. | |
| 2011/0018289 A1 | | 1/2011 | Barron | |

FOREIGN PATENT DOCUMENTS

| | | |
|---|---|---|
| DE | 243677 | 3/1987 |
| GB | 23362 | 10/1913 |
| GB | 153794 | 11/1920 |
| GB | 160871 | 3/1921 |
| GB | 284874 | 2/1928 |
| GB | 809624 | 2/1959 |
| JP | 04-176784 | 6/1992 |
| WO | 2007/115572 | 10/2007 |

* cited by examiner

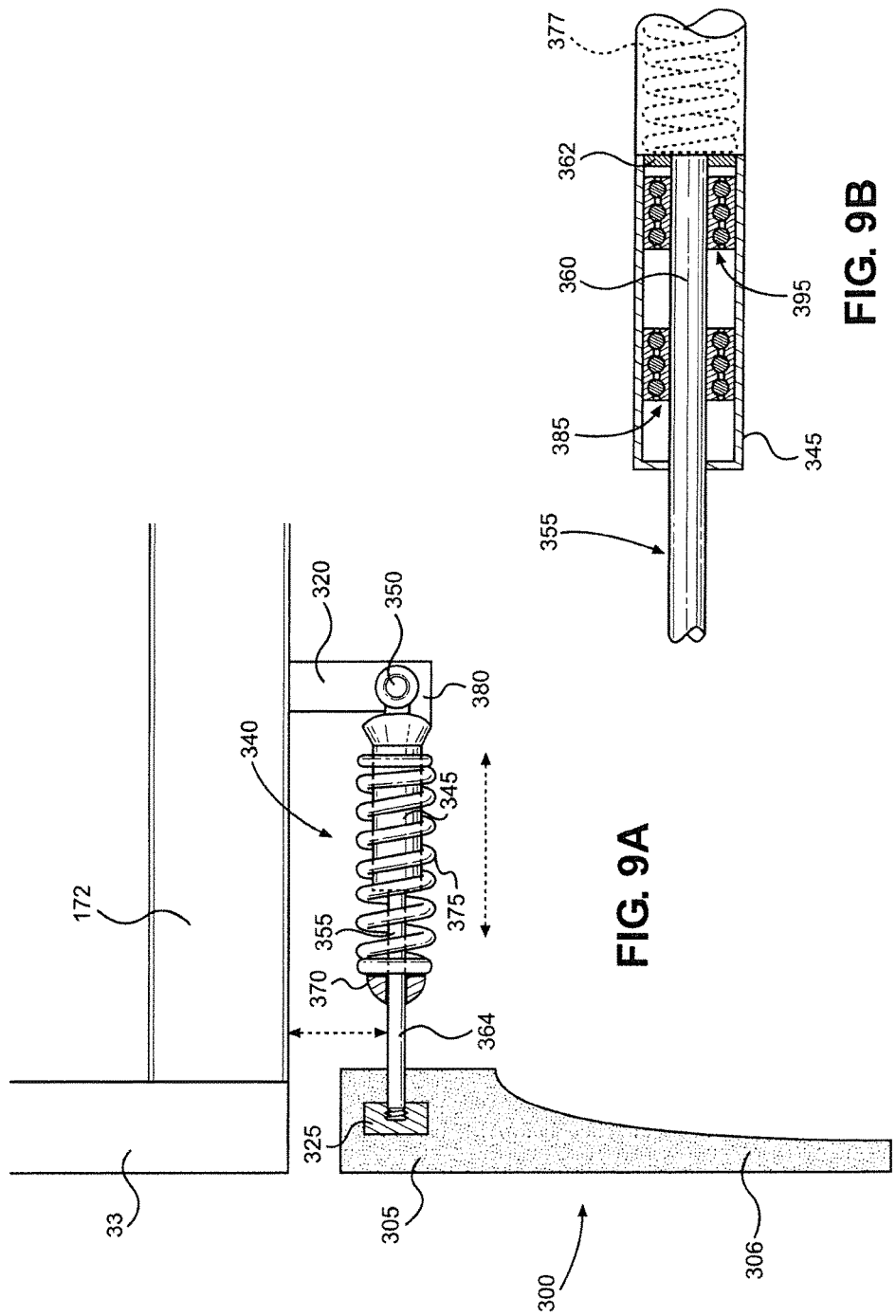

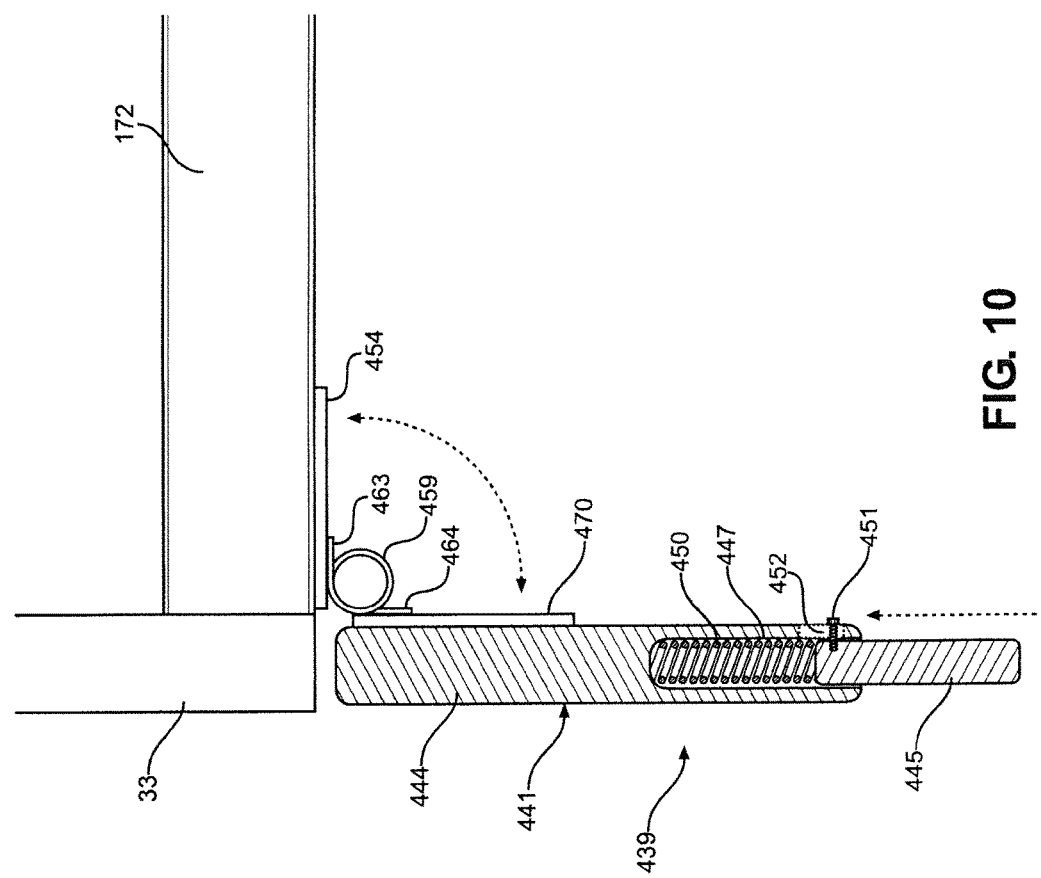

TELESCOPING VEHICLE SAFETY GUARD

CROSS REFERENCE TO RELATED APPLICATIONS

The present application represents a divisional of pending U.S. patent application Ser. No. 14/884,422 entitled "Telescoping Vehicle Safety Guard" filed Oct. 15, 2015.

BACKGROUND OF THE INVENTION

Field of the Invention

The present invention pertains to the art of vehicle safety devices and, more particularly, to a safety device mounted to a body of a vehicle and including a guard portion which is supported in front on a wheel set of the vehicle, in a compliant, telescoping manner, for both deflecting animate objects away from in front of the vehicle wheels and protecting the guard portion against damage by abutment of the safety guard with certain inanimate objects during operation of the vehicle.

Discussion of the Prior Art

Buses are commonly employed for various transportation purposes. For instance, buses are widely employed in metropolitan mass transit systems. Unfortunately, there are inherent dangers associated with the operation of buses. Many of the most serious of these injuries are a result of individuals being run over by the bus, such as when a person slips and falls in the road adjacent a wheel of the bus and the bus crushes a limb or other body part of the individual. Correspondingly, inanimate objects can also be crushed.

To address these concerns, it has been proposed in the art to mount a safety guard directly in front of wheels on a bus to establish a safety barrier between the wheels and objects. More specifically, as represented by U.S. Pat. Nos. 5,462,324 and 5,735,560, it is known to mount a safety barrier to undercarriage structure of a vehicle, such as a bus, with the safety barrier including a lower edge extending directly along a ground surface. The safety barrier is fixedly supported at various locations, such as to axle, frame and/or suspension structure. The safety barrier is angled such that, if an object is encountered during movement of the bus, the safety barrier forces the object out from under the vehicle to a position out of the path of the vehicle wheels.

In addition to mass transit buses, school buses are widely employed in connection with transporting students for educational purposes. Of course, still other types of buses also exist. Certainly, each of these additional types of buses, as well as other types of vehicles such as those used in the trucking industry, can benefit from incorporating safety guards. Regardless of the type of vehicle to which the safety guard is mounted, serious damage can be done to the guard if the guard abuts an inanimate object, such as a curb, pole, mailbox or the like, during operation of the vehicle. Depending on the level of damage, the safety guard may not even be able to perform its desired safety function, thereby requiring replacement. Given the monetary cost and time associated with replacing of these safety guards, this scenario is undesirable.

Based on the above, there exists the need for a more feasible mounting arrangement for a vehicle safety guard. In particular, there is seen to exist a need for a safety barrier mounting arrangement which will enable safety guards to be readily mounted to a wide range of vehicles in a manner which will protect the safety guard from significant damage when unintentionally abutting an inanimate object during operation of the vehicle, thereby prolonging the useful and effective life of the safety guard.

SUMMARY OF THE INVENTION

The present invention is directed to providing a safety guard for a vehicle, such as a school or transit bus, tractor trailer or the like-type vehicle, including a frontal guard, particularly in the form of a skirt or barrier, positioned in front (forward) of a rear wheel of the vehicle and preferably between front and rear wheels along at least one side of the vehicle that will function to assure that individuals and other animate objects lying in or adjacent the path of the vehicle will stay out of the path of the wheels for safety purposes, while being mounted for telescoping movement to protect the safety guard from damage upon abutting an inanimate object during operation of the vehicle. That is, the safety guard is positioned close enough to the ground so that, if an animate object is encountered, the safety barrier will force the object away from the vehicle and certainly out of the wheel path, while also being mounted so as to telescope or shift inwardly of the vehicle in the event the guard engages a relatively immovable inanimate object, such as a curb, pole, mailbox or the like, during operation of the vehicle. The shifting of the frontal guard is controlled such that the guard can only move along a defined axis. In addition, the frontal guard is resiliently mounted so as to be forced to rebound back to its fully operational position after any shifting based on engaging an inanimate object. In this manner, the safety guard can still fully perform its desired safety function, yet is protected from significant, undesirable and unintended damage which could affect its performance.

Additional objects, features and advantages of the present invention will become more readily apparent from the following detailed description of preferred embodiments when taken in conjunction with the drawings wherein like reference numerals refer to corresponding parts in the several views.

BRIEF DESCRIPTION OF THE DRAWINGS

FIG. 9A is a partial cross-sectional view illustrating another safety guard assembly embodiment;

FIG. 9B is a partial cross-sectional view of a portion of the assembly of FIG. 9A; and FIG. 10 illustrates a still further safety guard assembly embodiment constructed in accordance with the invention.

DETAILED DESCRIPTION OF THE PREFERRED EMBODIMENTS

Figure 1:
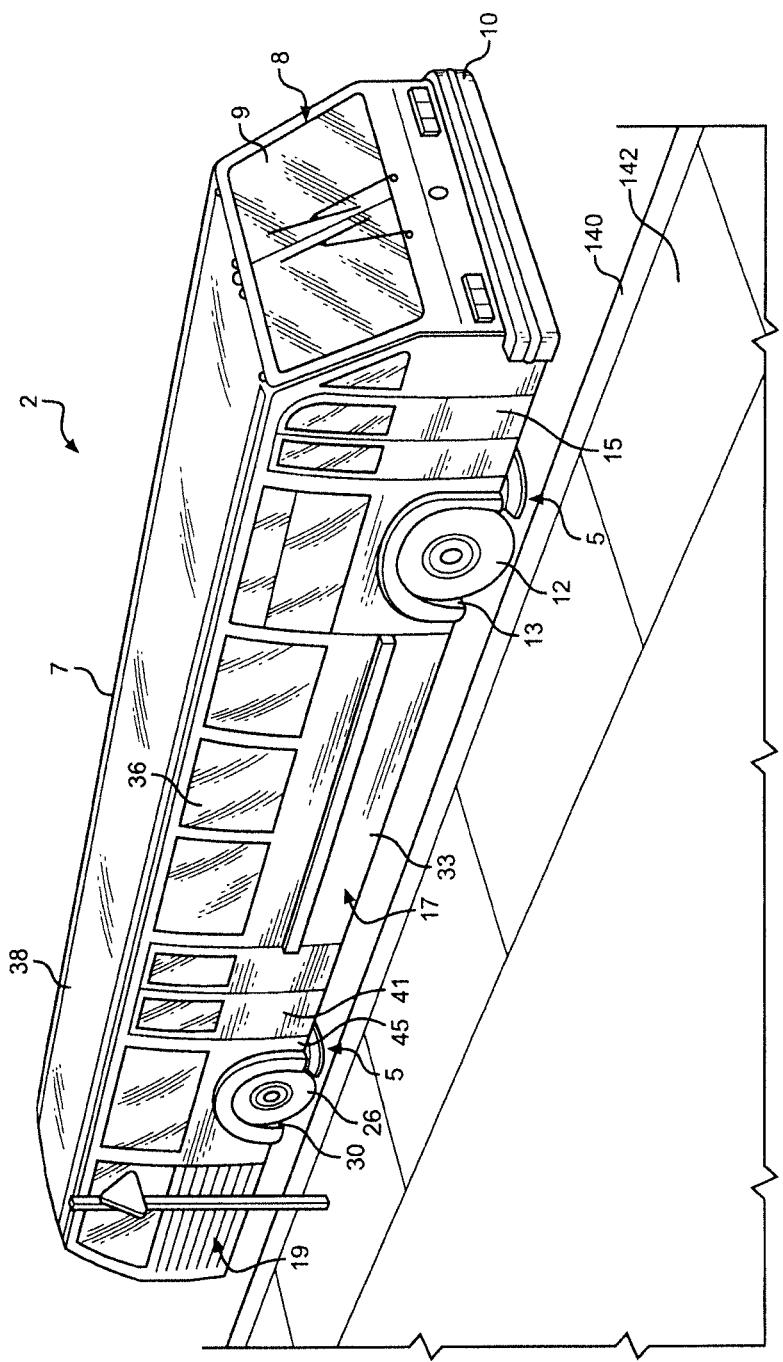
FIG. 1 is a perspective view of a transit bus having mounted thereto front and rear safety guard assemblies in accordance with the invention.

With initial reference to FIG. 1, a vehicle 2, shown as a transit bus, has attached thereto, at both fore and aft regions, a safety guard 5 constructed in accordance with the present invention. In general, vehicle 2 includes a body 7 having a front end section 8 including a windshield 9 and a bumper 10. Also provided at front end section 8 is a pair of front steerable wheels, one of which is indicated at 12 located within a wheel well 13. Arranged directly forward of wheel 12 is a forward most side door 15. Body 7 also includes a middle section 17 and a rear end section 19. Supporting rear end section 19 is a pair of rear wheels, one of which is indicated at 26 arranged in a wheel well 30 created in a side panel 33 of vehicle body 7. Also provided along side panel 33 are various fore-to-aft spaced windows 36 which are vertically arranged below a roof 38. Shown arranged alongside panel 33, forward of rear wheel 26, is a rear door 41. In connection with describing the invention, it should be noted that safety guard 5 is arranged at a lower region 45 between wheel well 30 and rear door 41. Safety guard 5 is actually mounted at this location beneath body 7 of vehicle 2 and is supported in front of rear wheel 26 in a compliant, telescoping manner for both deflecting inanimate objects in an operational position from in front of rear wheel 26 and protecting safety guard 5 against damage by abutment with certain inanimate objects during operation of vehicle 2 as will be detailed more fully below.

Figure 2:
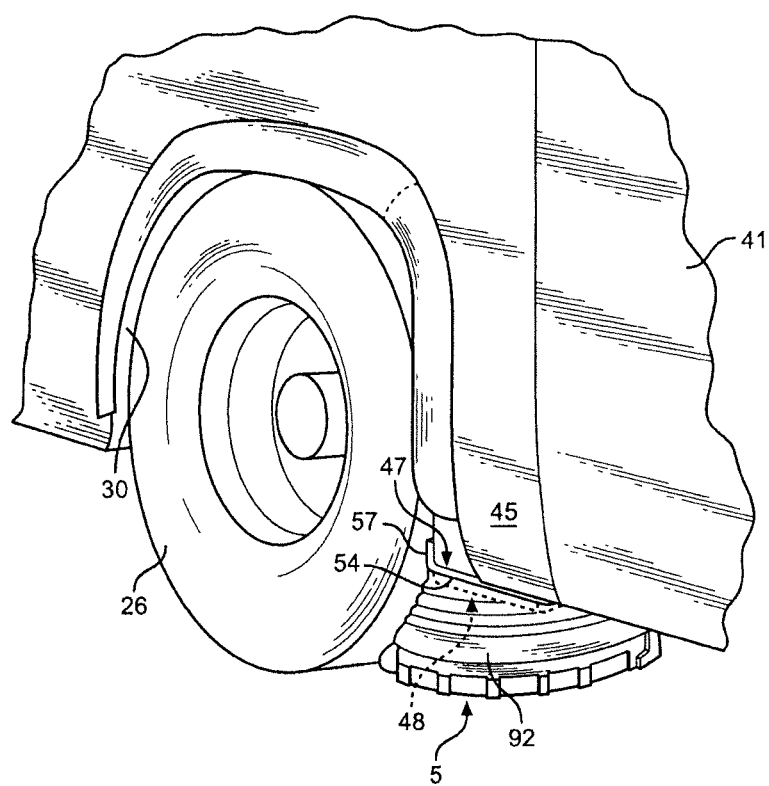
FIG. 2 is an enlarged view of the mounting of the rear safety guard assembly of FIG. 1.

At this point, it should be noted that the invention will be described with respect to a preferred mounting of safety guard 5 to vehicle body 7 in connection with rear wheel 26. However, safety guard 5 can actually be correspondingly mounted at a position in front of front wheel 12 as also shown in FIG. 1. As will also become more fully evident below, the particular mounting of safety guard 5 to body 7 can greatly vary in accordance with the present invention while accommodating the compliant, telescoping configuration referenced above. In any case, with reference to the mounting of safety guard 5 in front of rear wheel 26, FIG. 2 presents an enlarged view of lower region 45 while indicating a preferred mounting arrangement utilizing a first mounting component 47 affixed to body 7 and a second mounting component 48 affixed to safety guard 5, with these two mounting components 47, 48 being interconnected by a connection assembly generally indicated at 50 in FIG. 3.

Figure 3:
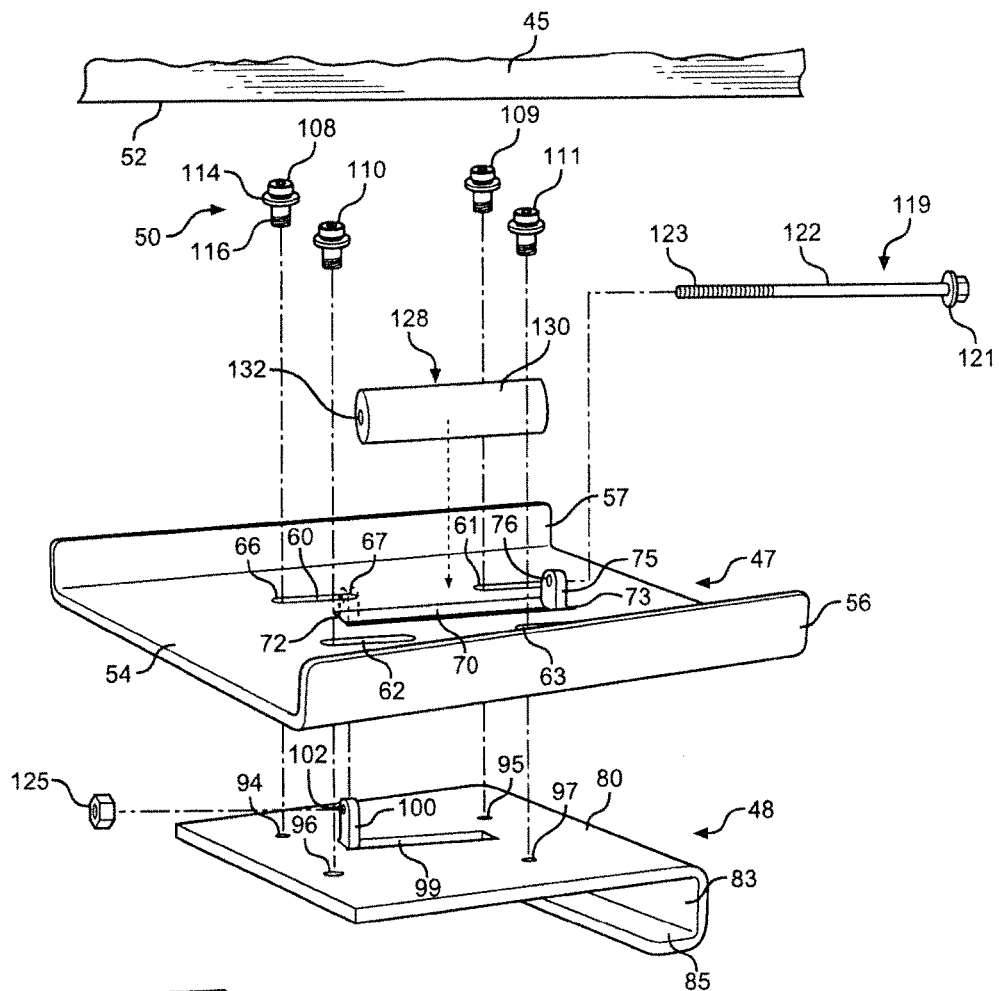
FIG. 3 is an exploded view of a safety guard mounting assembly constructed in accordance with a preferred embodiment of the invention.
Figure 3:
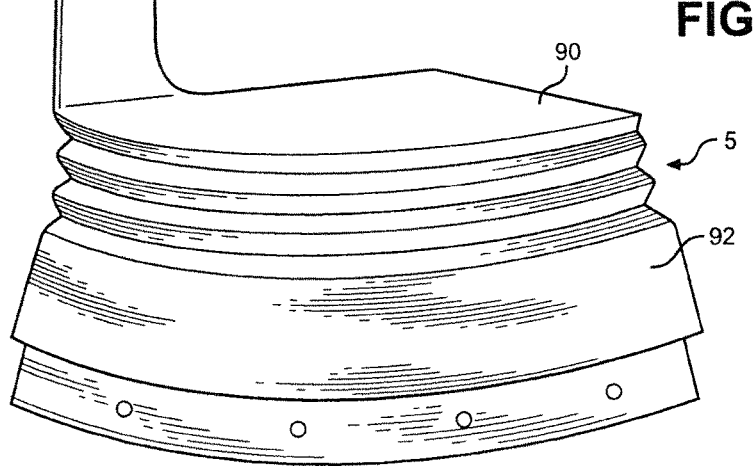

With specific reference to FIG. 3, the underside of body 7 is indicated at 52. First mounting component 47 includes a base 54 from which extend upstanding fore and aft side walls 56 and 57. Base 54 is formed with a plurality of spaced slots 60-63, each of which includes a first end 66 and a second end 67. As should be evident from viewing FIG. 3, slots 60 and 61 extend along a first axis, while slots 62 and 63 extend a second axis, with these axes being parallel to each other. Base 54 is also provided with a central, elongated slot 70 having a first end 72 and a second end 73. Projecting from second end 73 is an upstanding flange 75 of base 54. In the most preferred embodiment, upstanding flange 75 is formed by cutting a portion of base 54 and bending the same upward to establish the configuration shown in FIG. 3. However, a separate upstanding flange 75 could also be readily affixed, such as through welding, to base 54 of first mounting component 47. In any case, as shown, upstanding flange 75 is preferably formed with a through hole 76.

As also shown in FIG. 3, second mounting component 48 includes a main, upper plate 80 from which depends a side wall 83 that terminates in an in-turned leg 85. Second mounting component 48 is fixedly retained by an upper body portion 90 of safety guard 5. That is, safety guard 5 includes upper body portion 90 and a frontal guard piece 92 which is used to deflect animate objects from in front of wheels 12 and/or 26 during operation of vehicle 2 in a manner known in the art and set forth in U.S. Pat. Nos. 5,462,324 and 5,735,560, both of which are incorporated herein by reference. As the particular construction of frontal guard piece 92 is known in the art, it will not be further described herein. Instead, at this point, it should simply be realized that second mounting component 48 can be secured to upper body portion 90 in a various ways. In accordance with the most preferred form of the invention, second mounting component 48 is encapsulated in the integral molding of upper body portion 90 in a manner directly corresponding to the mounting arrangement disclosed in the '560 patent referenced above. Again, as will be more fully evident below, the particular construction and mounting of second mounting component 48 can greatly vary in accordance with the present invention such that the arrangement shown in FIG. 3 is only intended to be an exemplary embodiment.

As depicted, plate 80 of second mounting component 48 includes a plurality of spaced through holes 94-97 which are preferably threaded. In addition, plate 80 is also provided with a slot 99, the formation of which aids in establishing an upstanding tab member 100 having an associated through hole 102. When second mounting component 48 is encapsulated by safety guard 5 during manufacturing, tab member 100 extends above upper body portion 90, holes 94-97 are accessible through upper body portion 90, and both side wall 83 and leg 85 provide structural stiffness and integrity to safety guard 5.

As indicted above, first mounting component 47 is fixedly secured to the underside 52 of body 7. Again, the particular manner in which this attachment is performed can greatly vary in accordance with the present invention. In one preferred embodiment, upstanding side walls 56 and 57 are welded to underside 52. More important to the present invention is the manner in which second mounting component 48 is secured to first mounting component 47 for supporting frontal guard piece 92 yet accommodating compliant, telescoping movement of safety guard 5 relative to body 7. In particular, second mounting component 48 is positioned such that plate 80 is arranged below base 54, while upstanding tab member 100 projects into slots 70. At the same time, threaded holes 94-97 become aligned with spaced slots 60-63 respectively. Threaded fasteners 108-111 are then positioned through slots 60-63 and become threadably engaged to plate 80 at threaded holes 94-97 respectively. For this purpose, each threaded fastener 108-111 has associated therewith an upper washer 114, which extends about a respective slot 60-63, and a threaded end 116 which is received within a respective hole 94-97 of plate 80. With this arrangement, plate 80 is secured beneath base 54 while enabling relative sliding movement between first and second mounting components 47 and 48, with threaded fasteners 108-111 being movable between first end 66 and second end 67 of respective slots 60-63.

Connection assembly 50 also includes an elongated threaded fastener 119 having a head 121, a shaft 122 and a threaded end 123. Associated with elongated threaded fastener 119 is a nut 125. In addition, a dampening member 128 is adapted to be interposed in the connection between first mounting component 47 and second mounting component 48. In general, dampening member 128 takes the form of a spring element, which is employed to bias upstanding tab member 100 toward first end 72 of slot 70. In the embodiment shown, dampening member 128 takes the form of a cylindrical elastomeric block 130 having a through bore 132. Elongated threaded fastener 119 extends through hole 76 formed in upstanding flange 75, into through bore 132 of block 130 and finally out through hole 102 formed in tab member 100, whereat nut 125 is threaded onto threaded end 123 to secure dampening member 128 between upstanding flange 75 and upstanding tab member 100.

Figure 4:
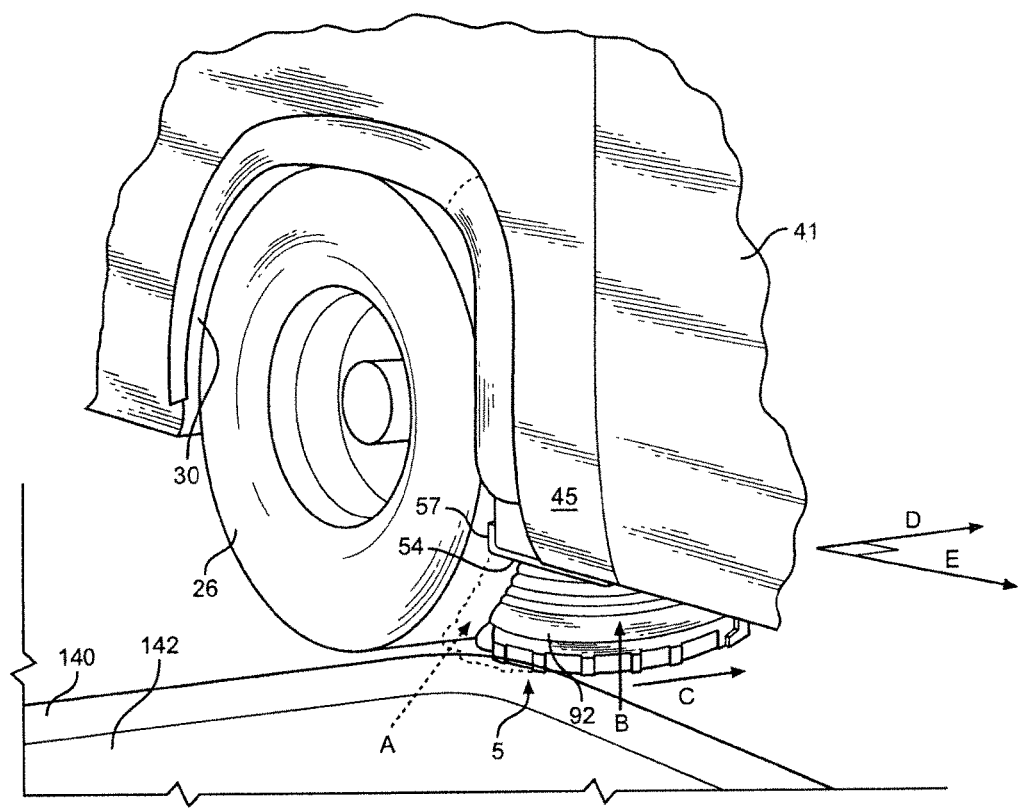
FIG. 4 is a perspective view, similar to FIG. 2, but illustrating a permissible telescoping movement for the safety guard in accordance with the invention.

With this configuration, second mounting component 48 is permitted to shift relative to first mounting component 47, while any shifting movement is resisted by the arrangement of dampening member 128. In a most preferred embodiment disclosed, slot 70 is arranged parallel to slots 60-63 so that the relative movement will occur along the axes defined by slots 60-63. In this manner, frontal guard piece 92 will assume the operational position shown in phantom at A in order to effectively deflect animate objects from in front of vehicle wheel 26 during operation of vehicle 2 while also permitting frontal guard piece 92 to be deflected in the direction of arrow C to the position shown at B in FIG. 4 if frontal guard piece 92 abuts an inanimate object with sufficient force during operation of vehicle 2 so as to prevent damage to frontal guard piece 92. More specifically, in FIG. 4, frontal guard piece 92 is shown to abut a raised curb 140 associated with a sidewalk 142 which has caused frontal guard piece 92 to shift in the direction of arrow C for a range defined by the length of slots 60-63. In the preferred embodiment of the invention, this length is in the order of 1-½ inches (approximately 2.5-3.8 cm). Shifting of second mounting component 48 relative to first mounting component 47 will result in compression of elastomeric block 130 such that, as soon as frontal guard piece 92 becomes disengaged with curb 140, frontal guard 92 will automatically shift back to the operational position indicated at A. By manually adjusting nut 125, the dampening characteristics of dampening member 128 can be readily altered.

To be most effective, frontal guard piece 92 is preferably arranged extremely close to wheel 26 in its operational position, such as within about an inch or two in front of wheel 26. To this end, the permitted shifting movement of frontal guard piece 92 upon hitting an inanimate object in accordance with the invention occurs at an angle which extends slightly forward of a transverse direction indicated at D in FIG. 4. That is, FIG. 4 indicates a transverse direction of vehicle 2 by arrow D and a forward direction of vehicle 2 by arrow E. The desired movement between second mounting component 48 and first mounting component 47 is shown to be in a direction which at least accommodates transverse movement but which prevents movement of the second mounting component 48, from the operational position, relative to the first mounting component 47 in a rearward direction of vehicle 2. Of course, the farther safety guard 5 is mounted away from wheel 26 and the permitted shifting thereof limited, some rearward movement of frontal guard piece 92 could be possible. However, in accordance with the most preferred embodiments of the invention, slots 60-63, as well as slot 70, are angled slightly forward of a transverse direction D of vehicle 2 in order to most effectively provide for deflecting animate objects from in front of wheel 26 while also protecting the frontal guard piece 92 against damage by abutment of the safety guard 5 with certain inanimate objects during operation of vehicle 2.

In connection with the embodiments disclosed above, the overall safety guard is preferably formed as a one-piece unit which is mounted in front of one or more select vehicle wheels and across a portion of the underbody in the order of two feet, while having a minimal gap between the frontal safety guard and both the ground and the related wheel. The frontal guard piece can be formed of plastic, rubber, urethane, aluminum or steel, although other known materials could be used to create a physical barrier strong enough to push a child or adult from in front of the wheel. For instance, it would be possible to manufacture at least a portion of the frontal guard piece from recycled tire rubber or fiberglass. As indicated above, various mounting arrangements can be employed for the safety guard, so long as the mounting arrangements accommodate the compliant, telescoping movement described above so as to enable the safety guard to effectively deflect animate objects from in front of the wheel while also enabling the safety guard to be shifted and then automatically retracted relative to the vehicle body when a force is exerted on the safety guard by an inanimate object engaged during normal operation of the vehicle. In addition, the safety guard can take other forms, such as a skirt which extends between the front and rear wheels of the vehicle as will be detailed more fully below with reference to the embodiments depicted in FIGS. 5-10 wherein like reference numerals refer to corresponding parts from the above-described embodiments.

Figure 5:
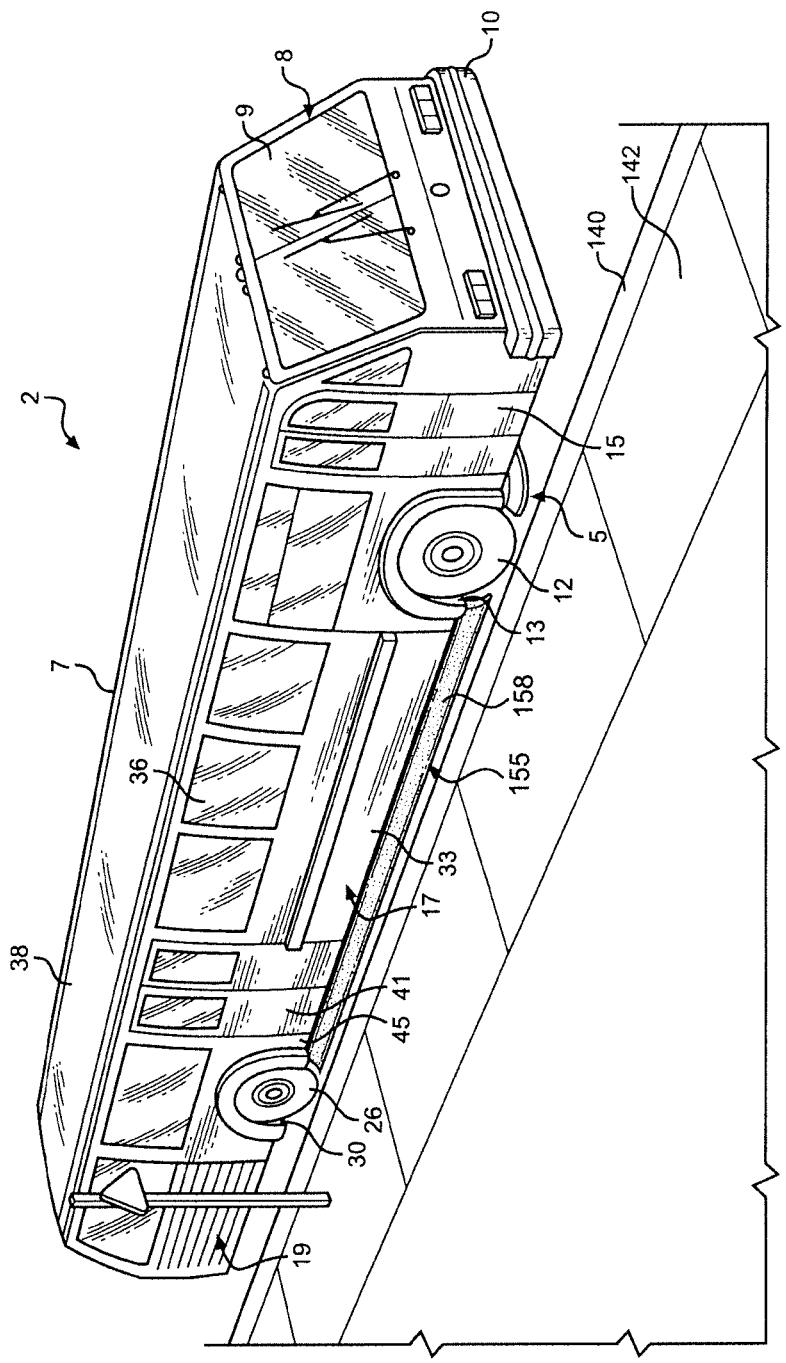
FIG. 5 is a perspective view, similar to FIG. 1, but showing an alternative or complementary safety guard assembly in accordance with the invention.

With initial reference to FIG. 5, there is depicted an embodiment wherein the safety guard is established by a barrier in the form of a skirt 155 including a guard piece 158 which is positioned beneath side panel 30 and extends, in the preferred embodiment shown, from directly in front of rear wheel 26 to just behind front wheel 12. Skirt 155 can be used alone or in combination with safety guard 5. Skirt 155 is formed from corresponding materials as safety guard 5, i.e., preferably of thick rubber or urethane construction but can be made from other materials including plastics, and similarly functions to protect animated objects from being run-over and crushed by wheel 26, while also being configured to telescopically shift relative to vehicle body 7 upon engagement with an inanimate object to prevent damage to skirt 155.

Figure 6:
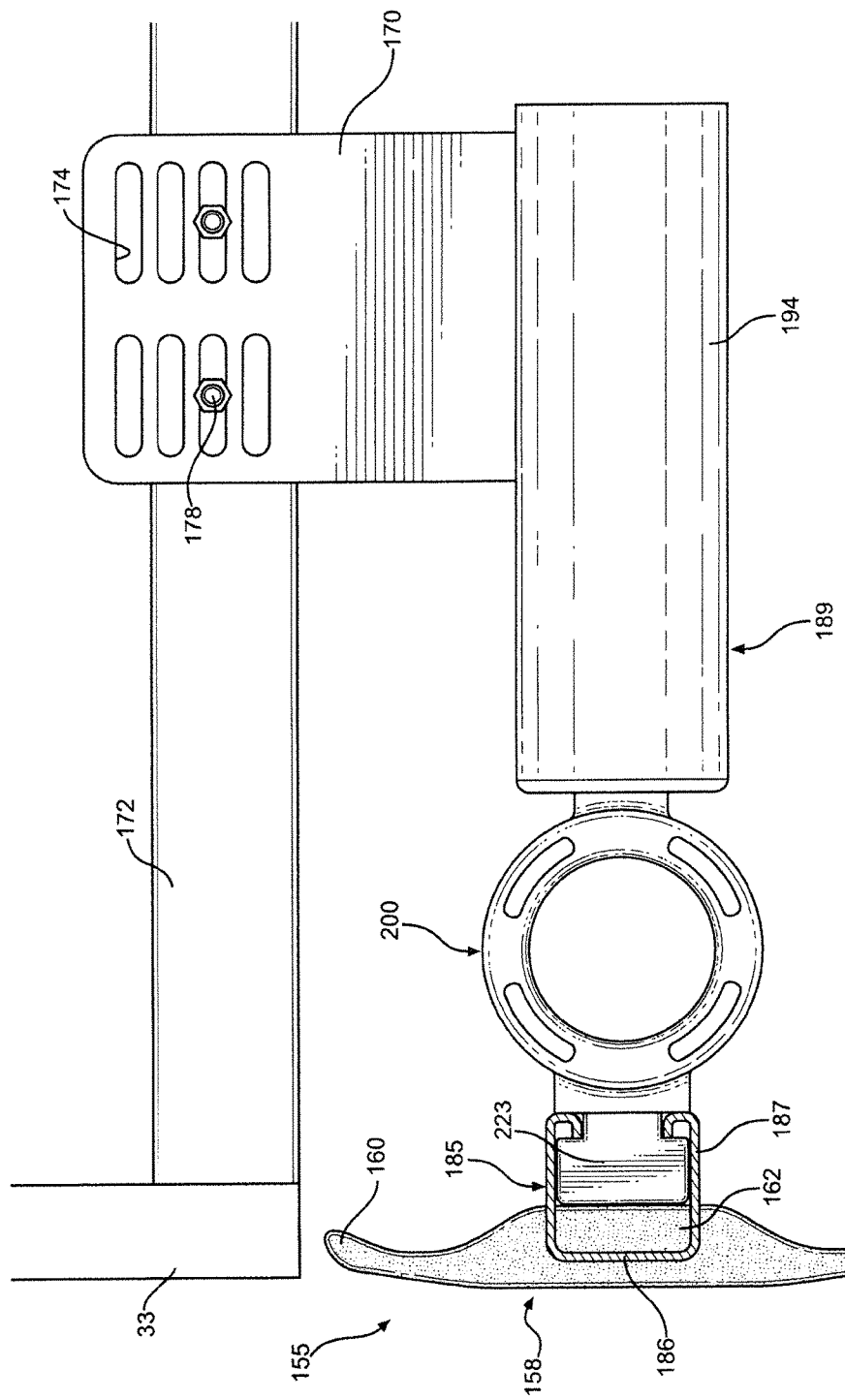
FIG. 6 is a partial cross-sectional view of a portion of the safety guard assembly of FIG. 5.
Figure 7:
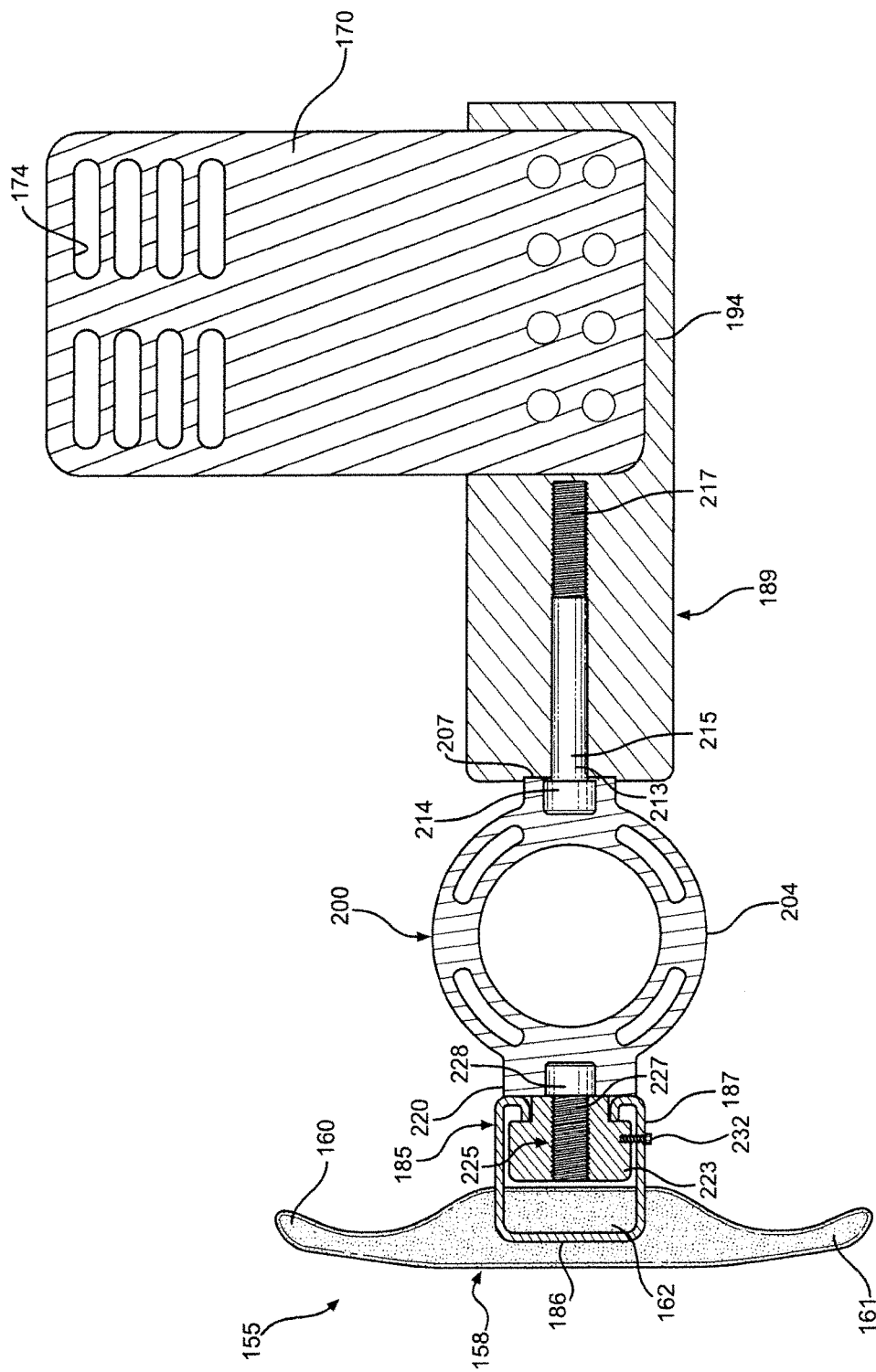
FIG. 7 is a complete cross-sectional view of the portion of the safety guard assembly of FIGS. 5 and 6.

As more clearly represented in FIG. 6, guard piece 158 includes an upper portion 160, a lower portion 161 and a central portion 162. In the embodiment shown, upper and lower portions 160 and 161 are symmetrically constructed but it should be clear that the configurations of these sections could be different and also vary in length from central portion 162. As also shown, skirt 155 has associated therewith a first mounting component 170 which is illustrated to take the form of a plate which is affixed to a frame member 172 of vehicle body 7. First mounting component 170 is preferably provided with various laterally and vertically spaced slotted openings, one of which is indicated at 174. Each opening 174 can receive a respective mechanical fastener 178, such as a bolt, or establish weld points to fix skirt 155 to body 7 below, and generally flush with side panel 33 as shown in this figure, although skirt 155 can also be recessed, such as in the order of 1-2 inches (about 2.5-5 cm), from side panel 33. 100331 Reference will now be made to FIGS. 6 and 7 in describing even further details of this preferred arrangement. In addition to first mounting component 170, a second mounting component 185 is also employed. As shown, second mounting component 185 includes an embedded portion 186, about which guard piece 158 is preferably molded, and a channel portion 187. Interposed between and interconnecting first mounting component 170 and second mounting component 185 is a connection assembly 189. With particular reference to FIG. 7, connection assembly 189 is shown to include both a housing 194 and a resilient connector 200 which is attached to housing 194. More specifically, resilient connector 200 includes an outer body 204 having a first projection or extension 207 which abuts housing 194. A bolt 213 is employed to secure resilient connector 200 to housing 194, with bolt 213 including a head 214 which can be molded into outer body 204 or made accessible from within resilient connector 200, a first shank portion 215 extending into housing 194, and a second shank portion 217 which is shown to be terminally threaded. At this point, it should be recognized that first mounting component 170 and resilient connector 200 can be mounted to housing 189 in various ways, including threaded connections. However, in accordance with a preferred embodiment, housing 194 is molded of a dense elastomeric material, such as urethane, and, more specifically, is molded about a lower portion of first mounting component 170 and the first and second shank portions 215 and 217 of one or more bolts 213 to integrate first mounting component 170, housing 189 and resilient connector 200.

As depicted, resilient connector 200 also includes a second projection or extension 220 which abuts channel portion 187 of second mounting component 185. More particularly, a mounting block or nut 223 is threadably received on a bolt 225 projecting from resilient connector 200 and then positioned within channel portion 187 to secure resilient connector 200 to second mounting component 185. More specifically, mounting block 223 is screwed onto a threaded portion 227 of bolt 225, while a head portion 228 of bolt 225 is retained by second extension 220. Once the desired adjustments are made, a set screw 232 is driven into mounting block 223 through channel portion 187.

Figure 8A:
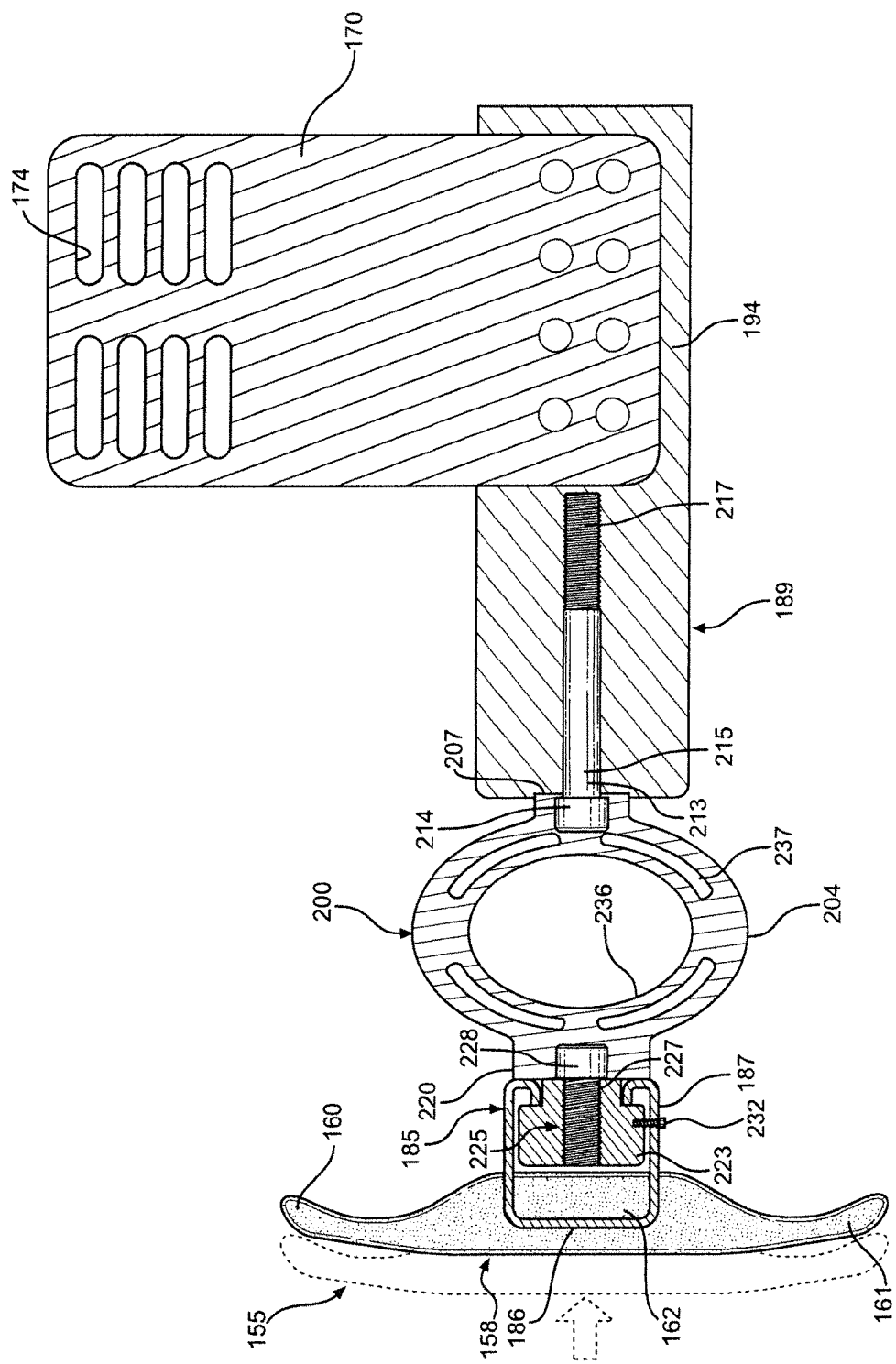
FIG. 8A depicts the safety guard assembly of FIG. 7 in a first deformation condition.

At this point, it should be noted that a series of connection assemblies 189 are actually provided to secure guard piece 158 along body 7 between wheels 12 and 26. For instance, each connection assembly 189 can be constructed in the manner set forth above and be longitudinally spaced apart to coincide with the distance between adjacent frame members 172 such as floor joists. Most importantly, although a wide range of construction and mounting arrangements could be employed, it is important in accordance with the invention that the overall mounting arrangement for skirt 155 provides for multiple degrees of freedom of movement of guard piece 158. In this embodiment, these multiple degrees of freedom of movement are provided by resilient connector 200 which is formed from a resiliently deformable, elastomeric material. In particular, FIG. 8A illustrates the deformation of resilient connector 200 when guard piece 158 receives a sufficient force directed laterally inwardly relative to a longitudinal direction of vehicle 2. More specifically, resilient connector 200 has an open core 236, as well as a series of circumferentially spaced slotted regions, one of which is indicated at 237 in body portion 204. With this construction, resilient connector 200 can deform to accommodate desired deflections, such as upon engagement with an animate or inanimate object, but also automatically springs back to its original shape.

Figure 8B:
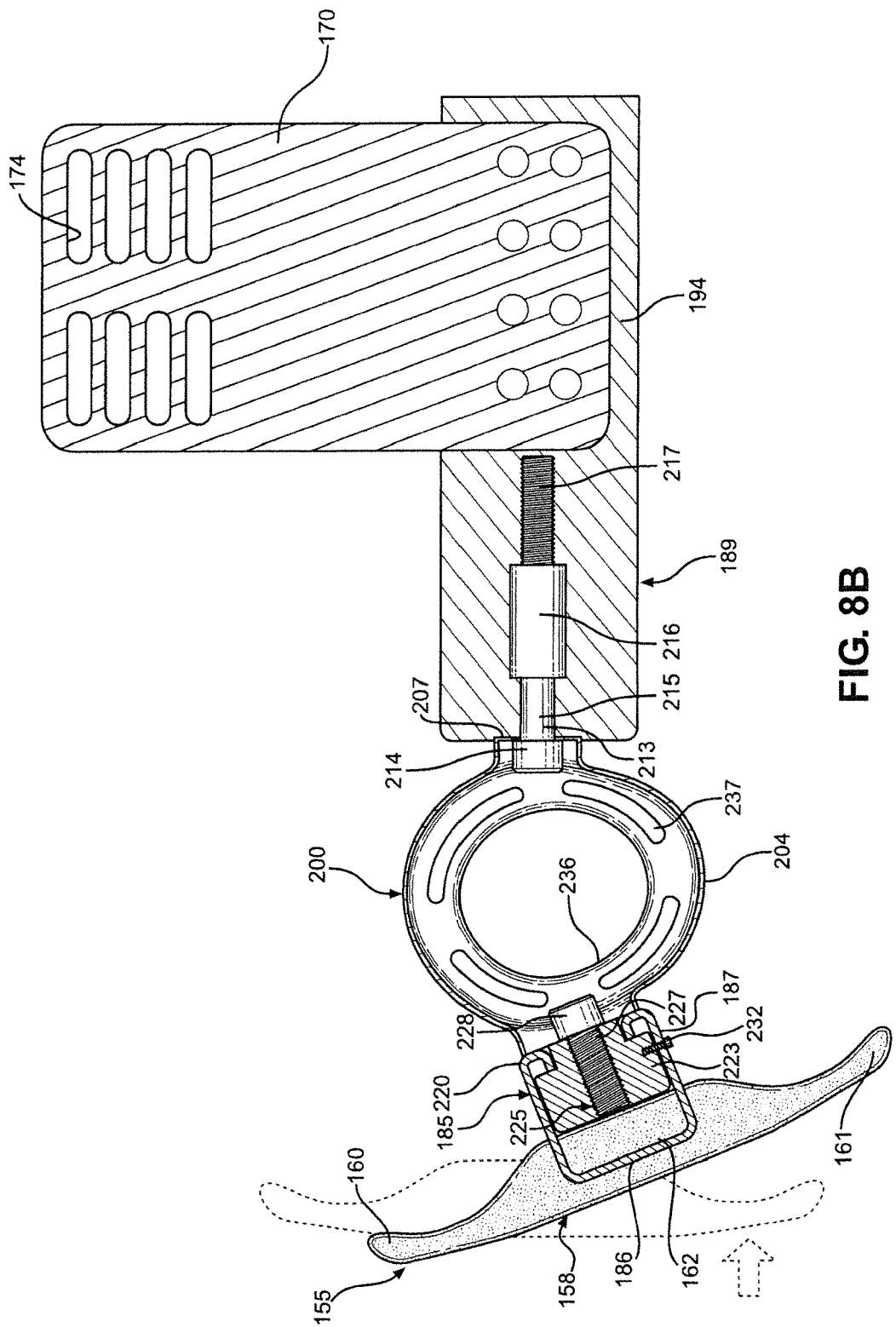
FIG. 8B depicts the safety guard assembly of FIG. 7 in a second deformation condition.

In addition to the linear deformation represented in FIG. 8A, resilient connector 200 can also resiliently undergo an arcuate (pivoting) deformation, as represented in FIG. 8B, such as upon engagement with an inanimate object like a curb or the like. This arcuate deformation actually enables guard piece 158 to, at least to some degree, also shift up and down. Again, this movement is accommodated by resilient connector 200 which can actually take various forms. For instance, resilient connector 200 can be an elastomeric member which could be forcibly deformed or a torsion spring biased joint which can be forced to rotate about a longitudinal axis. In any case, guard piece 158 can both linearly deflect and pivot such that lower portion 161 can also shift in a wide range of directions, including simultaneously inward and downward as shown in FIG. 8B. Of course, a combination of the simultaneous movements represented in FIGS. 8A and 8B is also possible.

FIGS. 9A and 9B depict another embodiment of the invention wherein the safety guard assembly is constituted by a barrier in the form of a skirt 300 which, like the other embodiments, is preferably made from a plastic or elastomeric material (most preferably urethane). As shown, skirt 300 includes an upper portion 305 and a lower, tapering portion 306. A first mounting component 320, which takes the form of a plate or bracket, is affixed to frame member 172 of vehicle body 7. In addition to first mounting component 320, a second mounting component 325 is provided, with second mounting component 325 being molded about or otherwise secured to skirt 300 at upper portion 305. Interposed between first and second mounting components 320 and 325 is a connection assembly 340. Basically, connection assembly 340 defines a shock absorber including a housing 345 which takes the form of a cylinder and is pivotally attached to first mounting component 320 at a joint 350. Connection assembly 340 also includes a shaft or rod 355 having a first end portion 360 provided with a piston 362 shiftably mounted within housing 345 (particularly see FIG. 9B) and a second end portion 364 which is secured to second mounting component 325. In one preferred form, second mounting component 325 is defined by an enlarged nut to which second end portion 364 is threadably secured, although various other attachment configurations or even an integral unit could be employed. Mounted for concurrent movement with second end portion 364 is a cup member 370. In addition, a spring 375 is provided about housing 345, with the spring 375 extending from adjacent pivot joint 350 to cup member 370.

With this mounting arrangement, skirt 300 can be maintained aligned with or slightly recessed from side panel 33, with upper portion 305 being spaced below frame member 172, such as by a gap in the order of 1-2 inches (approximately 2.5-5 cm) as depicted in FIG. 9A. At the same time, lower portion 306 will be spaced from a ground surface by a distance less than the height of standard curb 140 (with a curb being generally in the order of 4-6 inches or about 10-15 cm in height). Given the inclusion of pivot joint 350, skirt 300 can shift vertically relative to frame member 172. In addition, due to the inclusion of connection assembly 340, skirt 300 can also shift or telescope inwardly. Therefore, skirt 300 can both shift inward (in this case linearly against the biasing force of spring 375 which, by the way, could be replaced with a spring 377 within housing 345 as indicated in dotted in FIG. 9B) relative to side panel 33 and also shift upward (through pivoting at joint 350), such that these movements can be performed either individually or in combination along multiple, distinct axes, with the guard piece or skirt 300 being biased (gravity included) to automatically return to an operational position, such as represented in each of FIG. 9A.

Provisions are also made to prevent further pivoting of connection assembly 340 counterclockwise beyond the operational position shown in FIG. 9A. A wide range of structure could be employed for this purpose. For instance, one or more additional linkages could be employed for this purpose, such as a clamp supporting housing 345 and having a shoulder bolt extending from the clamp and into a bracket slot to limit a permissible decree of pivoting. However, in a simple form, it is preferred to just incorporate a stop, such as that designated at 380 in FIG. 9A, which extends from first mounting component 320 and is abutted by housing 345. In addition, to assure the smooth lateral movement of skirt 300, it is preferred to incorporate one or more sets of roller bearings, such as that indicated at 385 and 395 in FIG. 9B, acting between first end portion 360 and housing 345. Certainly, different mounting arrangements could be employed while still accommodating the desired movement of skirt 300 through multiple degrees of freedom. In addition, although housing 345 and shaft 355 are shown as cylindrical so as to have generally circular cross-sections, these components could actually be polygonal in cross-section while still accommodating the desired, limited relative sliding or telescoping movement. Furthermore, different arrangements could be utilized to assure the return to the desired operational condition shown after skirt 300 engages either animate or inanimate objects. That is, it is just important in accordance with the invention to enable skirt 300 to shift when engaging an inanimate object, such as curb 140, to avoid damage to skirt 300, while also assuring that skirt 300 will still function to deflect an animate object from at least in front of rear wheel 26.

FIG. 10 illustrates a still further embodiment which also accomplishes the desired multiple degrees of movement. As shown, a skirt 439 is defined by a guard piece 441 including a first guard member 444 and a second guard member 445. Second guard member 445 is telescopingly received for linear movement in a cavity 447 formed in first guard member 444 and a spring 450 biases second guard member 445 in a downward, substantially vertical direction. A fastener 451 extends through a slot 452 formed in first guard piece 444 and is secured to second guard member 445 to establish a permissible extent of deflection in the substantially vertical direction. Skirt 439 also includes a first mounting component or plate 454 for attachment to a respective frame member 172. A torsion spring 459 includes a first leg 463 affixed to first mounting component 454 and a second leg 464 which is affixed either directly to first guard member 444 or a second mounting component or plate 470 secured to first guard member 444. Again, as with the above-described embodiment, guard piece 441 can both shift inward (in this case arcuately through pivoting against the biasing force of spring 459) relative to side panel 33 and also shift upward (either through the pivoting or separately through the linear telescoping connection), such that these movements can be performed either individually or in combination along multiple, distinct axes, with the guard piece 441 being biased to automatically return to an operational position analogous to that shown in each of FIGS. 6, 7 and 9A.

Based on the above, it should be readily apparent that, in each of the FIG. 5-10 embodiments, a safety guard in the form of a skirt can function to deflect or otherwise prevent animate objects from a path of a vehicle wheel by direct engagement with the guard piece in an operational position during movement of the vehicle so as to prevent the animate body part from being run-over and crushed by the wheel, while also enabling the guard piece to shift from the operational position linearly and/or arcuately relative to the vehicle body during movement of the vehicle upon engagement of the guard piece with an inanimate object to prevent damage to the guard piece by the inanimate object and then automatically re-shift the guard piece back to the operational position. Although the skirt, which can made up of one or more panels, preferably extends below a side panel on at least one side of the vehicle substantially the entire distance between the front and rear wheels, the number of connection assemblies will vary depending on the spacing between underbody connection points, such as the location of the spaced frame members. As a stronger resistance to deflection is needed closer to the rear wheel, specifically for deflecting animate objects, the deflection stiffness of the skirt can increase front to rear. This can be performed in various ways, preferably by just employing stiffer springs near the rear wheel. In any case, although described with reference to preferred embodiments of the invention, it should be readily understood that various changes and/or modifications can be made to the invention without departing from spirit thereof In general, the invention is only intended to be limited by the scope of the following claims.

I claim:
1. A vehicle comprising:
a body having at least one side panel;
a pair of front steerable wheels spaced in a transverse direction of the body of the vehicle;
at least one pair of transversely spaced rear wheels which are longitudinally spaced from the front steerable wheels;
a door provided along the at least one side panel; and
a guard piece in the form of a skirt extending below the body of the vehicle such that the guard piece extends longitudinally between the front and rear wheels of the vehicle, forward of the rear wheels and below the side panel of the vehicle such that the skirt is positioned to deflect an animate object from a path of at least one of the rear wheels by direct engagement with the guard piece in an operational position during movement of the vehicle so as to prevent the animate object from being run-over and crushed by the at least one of the rear wheels, said skirt being mounted to the body, by a plurality of connection assemblies arranged at various spaced locations between the front and rear wheels of the vehicle, said plurality of connection assemblies providing for both linear and arcuate movement of the skirt relative to the body upon engagement with an object, while also being biased to automatically re-shift back to the operational position.
2. The vehicle of claim 1, wherein each of the plurality of connection assemblies is constituted by a deformable, resilient connection member which provides for the relative linear and arcuate movement.
3. The vehicle of claim 1, wherein each of the plurality of connection assemblies is constituted by a shock absorber attached to the skirt at one end and pivotally mounted to the body of the vehicle at another end, wherein the shock absorber can both linearly and arcuately shift relative to the body of the vehicle.
4. The vehicle of claim 1, wherein the skirt includes first and second guard members, with the second guard member being telescopingly received for linear movement in a cavity formed in the first guard member.
5. The vehicle of claim 1, further comprising: channel members mounting the skirt to the plurality of connection assemblies.
6. The vehicle of claim 1, wherein the vehicle includes a plurality of fore-to-aft space frame members, each of the plurality of connection assemblies being secured to a respective said frame member of the vehicle.
7. The vehicle of claim 1, further comprising: a plurality of members biasing the guard piece to the operational position.

8. The vehicle of claim 1, further comprising: at least one resilient connector mounting the guard piece to the body of the vehicle, with the at least one resilient connector accommodating each of the linear and arcuate movements.

9. The vehicle of claim 8, wherein the at least one resilient connector is deformable to establish each of the linear and arcuate movements.

10. The vehicle of claim 1 wherein, to produce the linear movement, the skirt is adapted to move either laterally inward relative to a longitudinal direction of movement of the vehicle or vertically relative to the body of the vehicle.

11. The vehicle of claim 10, wherein the guard piece is pivotally attached to the body of the vehicle to provide the arcuate movement.

12. A safety guard assembly comprising: a guard piece in the form of a skirt configured to extend below a body of a vehicle such that the guard piece extends longitudinally between front and rear wheels of the vehicle, forward of the rear wheels and below a side panel of the vehicle such that the skirt is positioned to deflect an animate object from a path of at least one of the rear wheels by direct engagement with the guard piece in an operational position during movement of the vehicle so as to prevent the animate object from being run-over and crushed by the at least one of the rear wheels, said skirt being configured to be mounted to the body by a plurality of connection assemblies arranged at various spaced locations between the front and rear wheels of the vehicle, said plurality of connection assemblies providing for both linear and arcuate movement of the skirt relative to the body upon engagement with an object, while also being biased to automatically re-shift back to the operational position.

13. The safety guard assembly of claim 12, wherein each of the plurality of connection assemblies is constituted by a deformable, resilient connection member which provides for the relative linear and arcuate movement.

14. The safety guard assembly of claim 12, wherein each of the plurality of connection assemblies is constituted by a shock absorber attached to the skirt at one end and configured to be pivotally mounted to the body of the vehicle at another end, wherein the shock absorber can both linearly and arcuately shift relative to the body of the vehicle.

15. The safety guard assembly of claim 12, wherein the skirt includes first and second guard members, with the second guard member being telescopingly received for linear movement in a cavity formed in the first guard member.

16. The safety guard assembly of claim 12, further comprising: channel members mounting the skirt to the plurality of connection assemblies.

17. The safety guard assembly of claim 12, further comprising: a plurality of members configured to bias the guard piece to the operational position.

18. The safety guard assembly of claim 12, further comprising: at least one resilient connector for mounting the guard piece to the body of the vehicle, with the at least one resilient connector accommodating each of the linear and arcuate movements.

19. The safety guard assembly of claim 18, wherein the at least one resilient connector is deformable to establish each of the linear and arcuate movements.

20. The safety guard assembly of claim 12 wherein, to produce the linear movement, the skirt is adapted to move either laterally inward relative to a longitudinal direction of movement of the vehicle or vertically relative to the body of the vehicle.

* * * * *